(No Model.)
S. G. DAVIS.
ROCK OR STUMP EXTRACTOR.
No. 596,961. Patented Jan. 4, 1898.
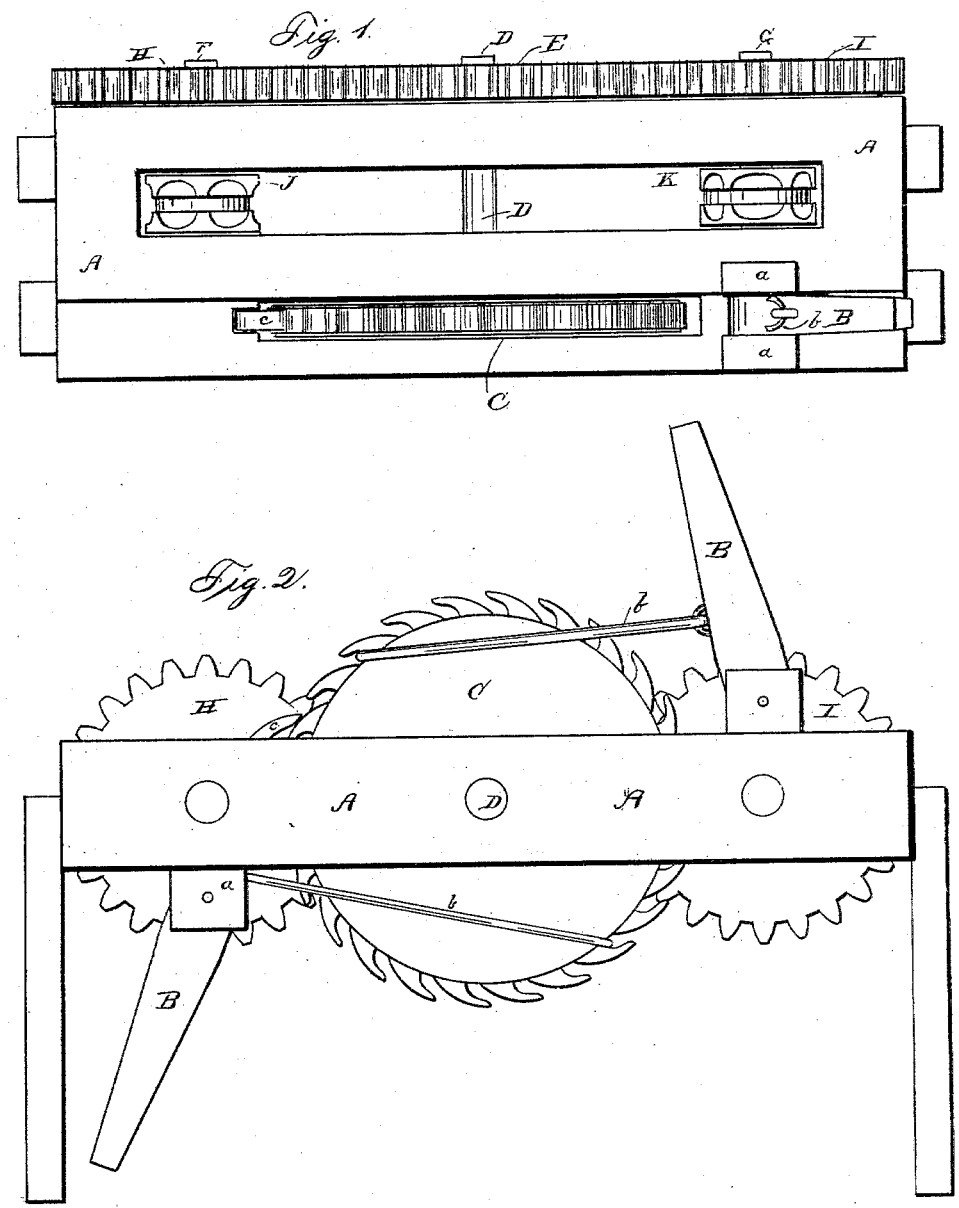
WITNESSES:
Otis D. Swett.
C. H. Childs.
INVENTOR
Steven G. Davis
BY
Thomas P. Simpson.
ATTORNEY.

UNITED STATES PATENT OFFICE.

STEVEN G. DAVIS, OF INDIANOLA, ILLINOIS.

ROCK OR STUMP EXTRACTOR.

SPECIFICATION forming part of Letters Patent No. 596,961, dated January 4, 1898.

Application filed April 28, 1897. Serial No. 634,233. (No model.)

*To all whom it may concern:*

Be it known that I, STEVEN G. DAVIS, a citizen of the United States, residing at Indianola, in the county of Vermillion and State of Illinois, have invented certain new and useful Improvements in Rock or Stump Extractors; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates generally to rock or stump extractors, and has for its special object to make an extractor which may be attached to different parts of the stump or rock and pull up in a vertical line from two points of advantage, thus lifting it directly out of the ground.

Figure 1 of the drawings is a plan view with the loop 6 broken away, and Fig. 2 a side elevation.

In the drawings, A represents a frame arranged when in use on runners or on wheels and provided with the lugs $a\ a$, on which are fulcrumed the hand-levers B B on opposite sides of a ratchet-wheel C, journaled in the frame on a shaft D, which has at the opposite end a pinion E. The levers B B are provided with loop-catches $b\ b$, pivoted to them and adapted to engage the teeth on the ratchet-wheel C, so as to turn the wheel around, where it is held at any desired point by a pivoted detent $c$. The shafts F G, one on each side of the shaft D, are provided with spur-wheels H I, which gear with the pinion E and with the chain-pulleys J K, which wind up the chains which have been attached to the stump or rock at two different parts, so as to pull it straight up out of the ground.

Where the rock or stump can be conveniently pulled out by a single chain, the spur-wheel H may be simply slipped off of its shaft, when all the power will be concentrated to turn one chain-wheel.

The ordinary endless chain on the pulleys is secured in a suitable manner to the stone or stump, and two men take hold of the levers B B, so as to pull them back and turn the ratchet-wheel C. This causes the stone or stump to be lifted straight up out of the ground.

Having thus described my invention, what I claim as new, and desire to protect by Letters Patent, is—

The rock or stump extractor comprising the frame A, levers B B, loop-catches $b\ b$ pivoted to levers, the ratchet-wheel C, shaft D, pinion E on said shaft, the shafts F G, spur-wheels H I, and chain-pulleys J K, the said spur-wheels being mounted on the shafts F G respectively, and in mesh with the pinion E substantially as shown and described.

In testimony whereof I affix my signature in presence of two witnesses.

STEVEN $\overset{\text{his}}{\underset{\text{mark}}{\times}}$ G. DAVIS.

Witnesses:
  WM. DAVIS,
  JAMES A. DAVIS.